United States Patent [19]
Taylor

[11] Patent Number: 4,630,887
[45] Date of Patent: Dec. 23, 1986

[54] OPTICAL FIBRE RIBBON STRUCTURE

[75] Inventor: John E. Taylor, Berkshire, England

[73] Assignee: BICC Public Limited Company, London, England

[21] Appl. No.: 620,426

[22] Filed: Jun. 14, 1984

[30] Foreign Application Priority Data

Jun. 17, 1983 [GB] United Kingdom ............... 8316493

[51] Int. Cl.⁴ .............................................. G02B 6/44
[52] U.S. Cl. ............................... 350/96.23; 29/419 R; 65/3.11; 174/117 F
[58] Field of Search ............... 350/96.23, 96.24; 29/419 R, 419 G; 65/3.11; 174/69, 99 E, 117 F, 126 CS, DIG. 12

[56] References Cited

U.S. PATENT DOCUMENTS

| | | | |
|---|---|---|---|
| 4,078,853 | 3/1978 | Kempf et al. | 350/96.23 |
| 4,178,069 | 12/1979 | Andersen et al. | 350/96.23 |
| 4,188,088 | 2/1980 | Andersen et al. | 350/96.23 |
| 4,195,906 | 4/1980 | Dean et al. | 350/96.23 |
| 4,199,225 | 4/1980 | Slaughter et al. | 350/96.23 |
| 4,232,935 | 11/1980 | Rohner et al. | 350/96.23 |
| 4,372,792 | 2/1983 | Dey et al. | 350/96.23 |

FOREIGN PATENT DOCUMENTS

| | | |
|---|---|---|
| 2014328 | 2/1978 | United Kingdom . |
| 1568546 | 5/1980 | United Kingdom . |
| 1583383 | 1/1981 | United Kingdom . |

OTHER PUBLICATIONS

Igarashi et al; "Composite Fiber-Optic Overhead Ground Wire"; *Int'l Wire & Cable Symposium Proc.;* pp. 312-321; Nov. 1980.

*Primary Examiner*—William L. Sikes
*Assistant Examiner*—Robert E. Wise
*Attorney, Agent, or Firm*—Buell, Ziesenheim, Beck & Alstadt

[57] ABSTRACT

An optical fibre ribbon structure suitable for use in an optical cable or other application where there is a risk that optical fibres will be subjected to a tensile force comprises a plurality of optical fibres and flexible reinforcing elements of resilient material arranged side by side and embedded in an elongate plastics body. Each resilient reinforcing element is set in such a form that the ribbon structure follows a path of smoothly curved undulations whose axes of curvature lie parallel to one another and normal to the longitudinal axis of the ribbon structure. When the undulting ribbon stucture is subjected to a tensile force, the ribbon structure straightens in a lengthwise direction against the action of the resilient reinforcing elements thereby reducing the tensile force otherwise applied to the optical fibres. When the tensile force is removed, the ribbon structure returns towards its original undulating form.

15 Claims, 5 Drawing Figures

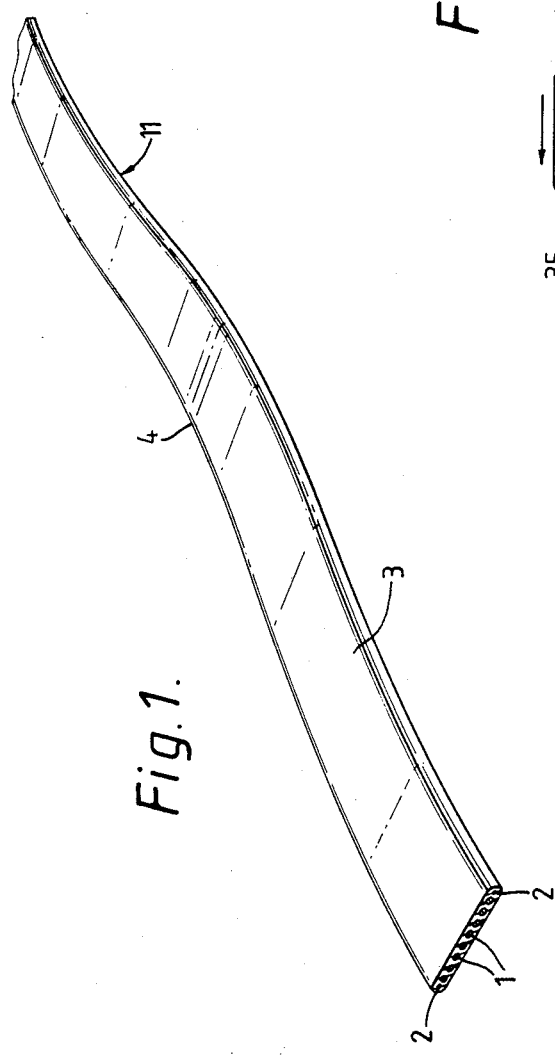
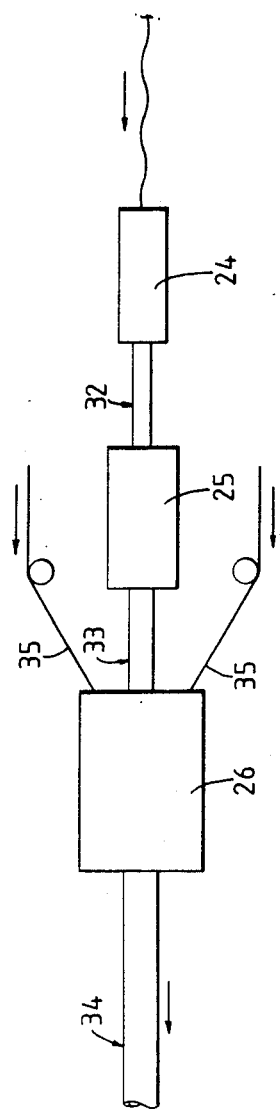

OPTICAL FIBRE RIBBON STRUCTURE

This invention relates to optical fibre ribbon structures for the transmission of the ultra-violet, visible and infra-red regions of the electromagnetic spectrum, which regions, for convenience, will hereinafter all be included in the generic term "light" and especially, but not exclusively, to optical fibre ribbon structures for use in the communications field adapted for transmission of light having a wavelength within the range 0.8 to 1.9 micrometers.

The invention is particularly concerned with an optical fibre ribbon structure of the kind comprising a plurality of optical fibres arranged side by side and embedded in an elongate body of plastics material.

It is an object of the present invention to provide an improved optical fibre ribbon structure of the aforesaid kind which is especially, but not exclusively, suitable for use in an optical cable or other application where there is a risk that optical fibres will be subjected to a tensile force.

According to the invention, the improved optical fibre ribbon structure comprises a plurality of optical fibres and at least one flexible elongate reinforcing element of substantially resilient material arranged side by side and embedded in an elongate body of plastics material, wherein the or each resilient reinforcing element is set in such a form that the ribbon structure follows a path of smoothly curved undulations whose axes of curvature lie transverse to the longitudinal axis of the ribbon structure, the arrangement being such that, when the undulating ribon structure is subjected to a tensile force, the ribbon structure straightens in a lengthwise direction against the action of the undulating resilient reinforcing element or elements thereby reducing the tensile force applied to the optical fibres and, when the tensile force is removed, the ribbon structure returns towards its original undulating form.

Preferably, the axes of curvature of the undulations lie parallel to one another and substantially normal to the longitudinal axis of the optical fibre ribbon structure.

The undulating optical fibre ribbon structure preferably includes two or more than two flexible elongate reinforcing elements of substantially resilient material uniformly spaced across the width of the ribbon structure. In a preferred embodiment, the undulating optical fibre ribbon structure includes two flexible resilient reinforcing elements between which the separate optical fibres are arranged side by side.

The flexible resilient reinforcing elements are preferably of a metal or metal alloy, copper or stainless steel being preferred, but where the undulating optical fibre ribbon structure is to be used in applications where the presence of metal or metal alloy is not desirable, the reinforcing elements may be made of a non-metallic resilient material such as polyethylene terephthalate.

For optical fibres having an overall diameter of 250 micrometers, preferably the radius of curvature of each undulation of the undulating optical fibre ribbon structure is not less than 40 millimeters.

The undulating optical fibre ribbon structure preferably is manufactured by causing a plurality of separate optical fibres and at least one flexible elongate reinforcing element of substantially resilient material to travel substantially side by side in the directions of their lengths with their axes lying in a substantially common plane; applying to the advancing optical fibres and to the advancing resilient reinforcing element or elements an overall coating of a plastics material to form a plastics coated reinforced optical fibre array; feeding the plastics coated reinforced optical fibre array between a pair of advancing tapes; subjecting the advancing taped plastics coated reinforced optical fibre array to a curing operation to cure the plastics material and cause it to bond both to the embedded optical fibres and resilient reinforcing element or elements and lightly to the tapes; peeling the tapes away from the reinforced optical fibre array to form a reinforced optical fibre ribbon structure; and before or after the tapes have been peeled away, causing the advancing ribbon structure to be partially wrapped around each of a plurality of transversely extending, longitudinally spaced formers of substantially circular or partially circular cross-section travelling in the same direction as the advancing ribbon structure and at such a speed that there is substantially no relative movement between the advancing formers and the ribbon structure travelling therebetween, the direction of wrap around one former being in the opposite circumferential direction to the direction of wrap around the or each adjacent former and the circumferential extent of wrap around each of the formers being such that the or each resilient reinforcing element is set in such a form that the optical fibre ribbon structure follows a path of smoothly curved undulations whose axes of curvature lie transverse to the longitudinal axis of the ribbon structure.

Preferably, the transversely extending longitudinally spaced formers are carried on a pair of advancing endless belts, the formers on one belt inter-engaging between the formers on the other belt.

Each of the formers will have a radius of curvature substantially less than the desired radius of curvature of each undulation of the undulating optical fibre ribbon structure but since, during manufacture of the undulating optical fibre ribbon structure, the ribbon structure is caused to follow a path of smoothly curved undulations whose radii of curvature are substantially less than the desired minimum value for only a very brief period, no permanent damage is caused to the optical fibres which would affect their light transmission efficiency or their long term strength.

Where the or each resilient reinforcing element is of copper or other metal or metal alloy, preferably the set in the resilient reinforcing element is mechanically formed by causing the advancing optical fibre ribbon structure to be partially wrapped around each of a plurality of formers of such diameter and so spaced apart and staggered with respect to the rectilinear axis of the advancing ribbon structure that the resilient reinforcing element is deformed beyond its elastic limit. Where the or each resilient reinforcing element is of polyethylene terephthalate or other non-metallic resilient material, preferably the set in the resilient reinforcing element is thermally formed by heating the advancing optical fibre ribbon strucure upstream of the plurality of transversely extending, longitudinall:· spaced formers, say to a temperature of approximately 150° C., and, as the optical fibre ribbon structure is passing through the plurality of formers, cooling the ribbon structure, e.g. by blowing cold air on to the formers, to such an extent that undulations having the desired radius of curvature are set in the resilient reinforcing element of the ribbon structure.

The invention also includes an optical cable having an outer sheath of plastics material and having, extending throughout its length, at least one bore in which is loosely housed at least one improved optical fibre ribbon structure as hereinbefore described.

The sheath may bound a single bore extending along the length of the optical cable or it may surround two or more separately formed tubes of plastics material, the bore of at least one of said tubes having loosely housed therein at least one improved optical fibre ribbon structure as hereinbefore described.

In all cases, the or each bore loosely housing an undulating optical fibre ribbon structure may be substantially filled throughout its length with a silicone gel or with a greasy water-impermeable medium, such as a water-impermeable medium consisting of, or comprising as a major constituent petroleum jelly, or a silicone grease, the silicone gel or the greasy water-impermeable medium being of such a consistency that the or each undulating optical fibre ribbon structure is free to move relative to the wall of the bore in which it is loosely housed.

An overhead electrical conductor utilizing the undulating optical fibre ribbon structure of this invention is disclosed in my copending application Ser. No. 620,427.

The invention is further illustrated by a description, by way of example, of the preferred undulating optical fibre ribbon structure and its method of manufacture and of one preferred form of optical cable incorporating an undulating optical fibre ribbon structure and its method of manufacture, with reference to the accompanying drawings, in which:

FIG. 1 is an isometric diagrammatic view, drawn on an enlarged scale, of the preferred undulating optical fibre ribbon structure;

Figure 2:
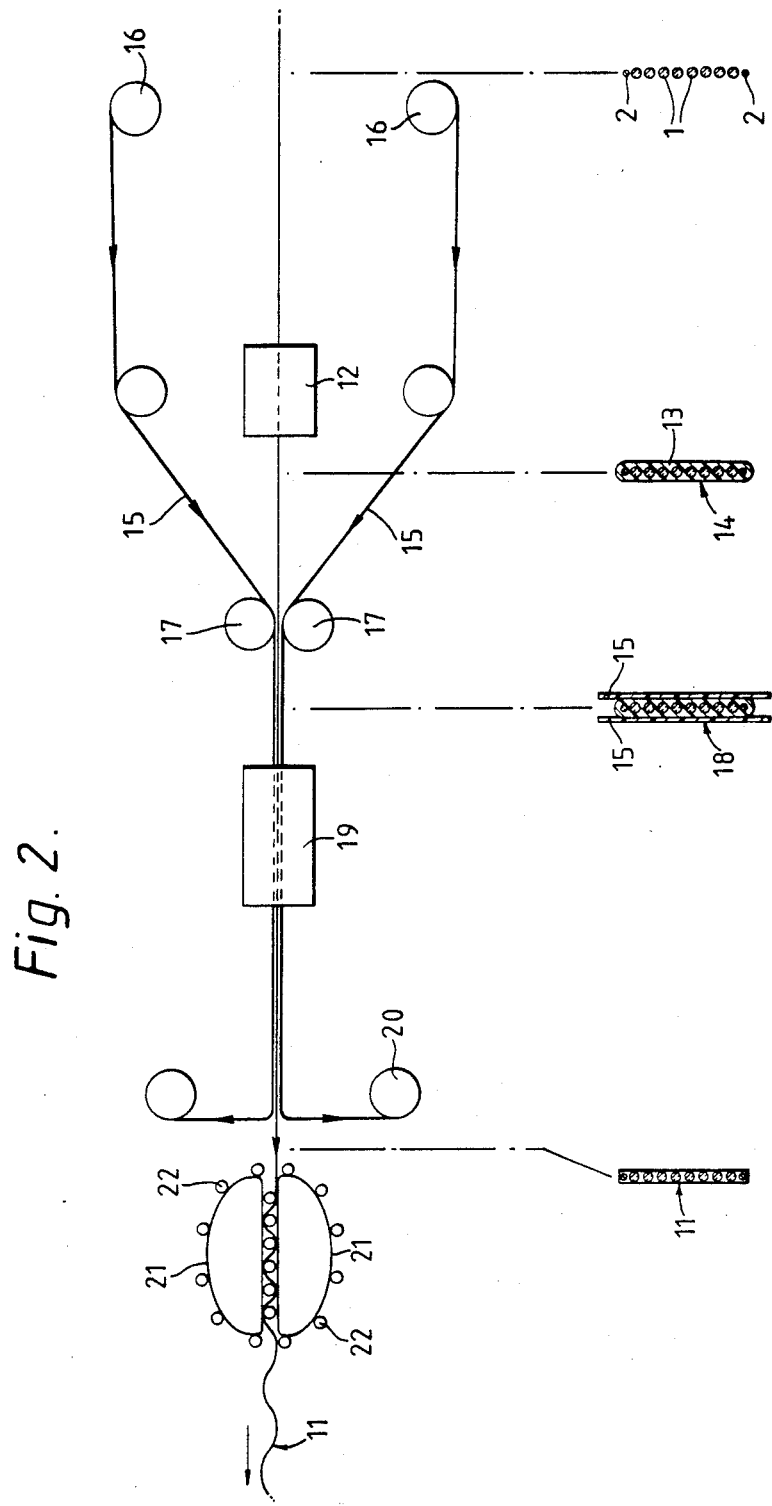
FIG. 2 is a schematic representation of the preferred method of manufacturing the undulating optical fibre ribbon structure shown in FIG. 1.

Referring to FIG. 1, the preferred undulating optical fibre ribbon structure 11 comprises eight optical fibres 1 and two resilient copper wires 2 arranged side by side and embedded in an elongate body 3 of silicone acrylate, the eight optical fibres being arranged between the two copper wires. Each of the optical fibres 1 has an overall diameter of 250 um. Each of the copper wires 2 has a diameter of 200 um and is coated with a layer of heat curable plastics material which improves adhesion between the copper wire and the elongate body 3 of silicone acrylate and which does not absorb an undesirable amount of infra-red radiation when the silicone acrylate of the elongate body is cured by ultra-violet radiation. The plastics coating on each copper wire 2 may be coloured to assist in identifying the optical fibre ribbon structure. Each of the optical fibres 1 may have a coating of a colour different from that of a coating on each of the other optical fibres. Each copper wire 2 is set in such a form that the ribbon structure follows a path of smoothly curved undulations 4 which have radii of curvature of approximately 40 mm and whose axes of curvature lie parallel to one another and substantially normal to the longitudinal axis of the optical fibre ribbon structure. When the undulating ribbon structure 11 is subjected to a tensile force, the ribbon structure straightens in a lengthwise direction against the action of the undulating resilient copper wires 2 thereby reducing the tensile force that would otherwise be applied to the optical fibres 1. After the tensile force is removed, the resilient copper wires 2 cause the ribbon structure to return towards its original undulating form.

In the preferred method of manufacturing the preferred undulating optical fibre ribbon structure as shown in FIG. 2, eight separate optical fibres 1, each having a outer coating of an acrylate, and two copper wires 2, each having an outer coating of a heat curable plastics material, are caused to travel from supply spools (not shown) substantially side by side in the directions of their lengths with their axes lying in a substantially common plane and with the optical fibres arranged between the two copper wires through a bath 12 where an overall coating 13 of an acrylate is applied to the advancing optical fibres and copper wires to form an acrylate-coated reinforced optical fibre array 14. Downstream of the bath 12, a pair of tapes 15 of oriented polyethylene terephthalate being drawn from supply spools 16 are fed, with the acrylate-coated reinforced optical fibre array 14 between a pair of pinch rolls 17 which urge the tapes into contact with the opposite major faces of the acrylate-coated reinforced optical fibre array. The advancing taped acrylate coated reinforced optical fibre array 18 then passes through an oven 19 where the acrylate in which the optical fibres are embedded is cured by ultra-violet radiation to cause the acrylate to bond both to the embedded acrylate-coated optical fibres 1 and plastics-coated copper wires 2 and lightly to the tapes 15. Downstream of the oven 19, the tapes 15 are peeled away from the optical fibre array on to take-up spools 20 to form an optical fibre ribbon structure 11. The advancing optical fibre ribbon structure 11 then passes between a pair of endless belts 21, advancing in the direction of travel of the optical fibre ribbon structure, each of which belts carries a plurality of transversely extending, longitudinally spaced formers 22 of partially circular cross-section, the formers on one belt inter-engaging between the formers on the other belt. The optical fibre ribbon structure 11 is partially wrapped around each of the inter-engaging formers 22, the direction of wrap around one former being in the opposite circumferential direction to the direction of wrap around each or the adjacent former. The circumferential extent of wrap around each of the formers 22 is such that each resilient copper wire 2 is set in such a form that, on emerging from the endless belts 21, the optical fibre ribbon structure follows a path of smoothly curved undulations whose axes of curvature lie parallel to one another and substantially normal to the longitudinally axis of the optical fibre ribbon structure. The undulating optical fibre ribbon structure has an overall width of 2.5 mm and an overall thickness of 0.3 mm.

Figure 3:
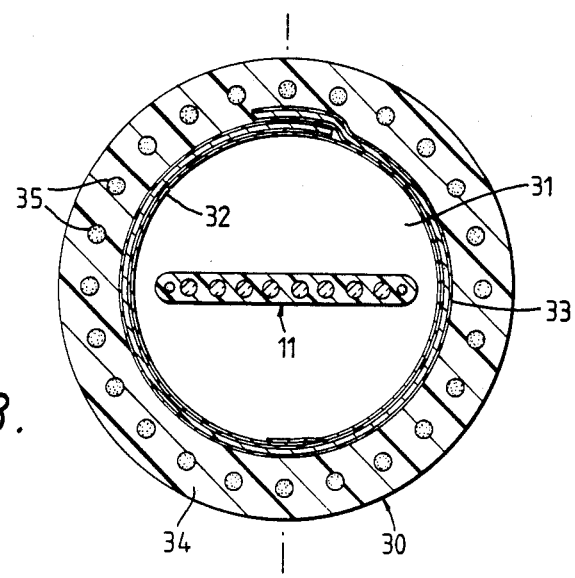
FIG. 3 is a transverse cross-sectional view of a preferred optical cable incorporating the preferred undulating optical fibre ribbon structure shown in FIG. 1.
Figure 4:
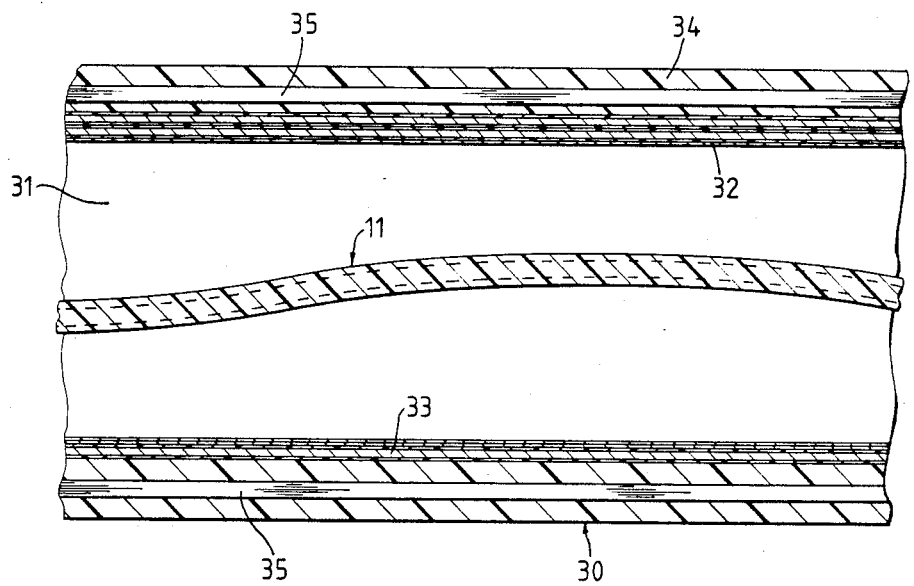
FIG. 4 is a sectional side view of the optical cable taken on the line IV—IV in FIG. 3, and, FIG. 5 is a schematic representation of the preferred method of manufacturing the preferred optical cable shown in FIGS. 3 and 4.

The preferred optical cable shown in FIGS. 3 and 4 comprises a composite tube 30 which bounds a bore 31 and which comprises a longitudinally extending, transversely folded paper tape 32 whose longitudinally extending marginal edges overlap and are secured together by adhesive, a longitudinally extending, transversely folded plastics/aluminum/plastics composite tape 33 whose longitudinally extending marginal edges overlap at a position circumferentially spaced from the overlapping marginal edges of the paper tape 32, and an outer extruded sheath 34 of plastics material which is bonded to the outer plastics coating of the composite tape 33. Embedded in the plastics sheath 34 at circumferentially spaced positions are twenty four bunches 35 of compacted yarns of glass fibre, each of which has undulations that serve to improve the mechanical bonding of the bunch within the sheath and the flexibility of the cable. Loosely housed in the bore 31 of the optical cable is an undulating optical fibre ribbon structure as shown in FIG. 1. The bore 31 has a diameter of 8.5 mm; the composite tube 30 has an overall diameter of 15 mm.

As will be seen with reference to FIGS. 2 and 5, manufacture of the undulating optical fibre ribbon structure 11 shown in FIG. 1 and of the optical cable shown in FIGS. 3 and 4 is effected in tandem. The undulating optical fibre ribbon structure 11 is manufactured as described with reference to FIG. 2 and, on emerging from the endless belts 21, the undulating optical fibre ribbon structure passes through a device 24 by means of which the paper tape 32 is longitudinally applied to and transversely folded around the advancing undulating optical fibre ribbon structure in such a way that longitudinally extending marginal edge portions of the paper tape overlap and are secured together by adhesive and the undulating optical fibre ribbon structure is loosely housed in the paper tube so formed. On emerging from the device 24, the paper-covered undulating optical fibre ribbon structure passes through a device 25 where the plastics/alumunium/plastics composite tape 33 is longitudinally applied to and transversely folded around the paper-covered undulating optical fibre ribbon structure in such a way that longitudinally extending marginal edge portions of the composite tape overlap at a position circumferentially spaced from the overlapping edge portions of the paper tape 32. On emerging from the device 25, the composite tape-covered, paper-covered undulating optical fibre ribbon structure passes through an extrusion machine 26 into which twenty four bunches 35 of compacted yarns of glass fibre are fed from spools (not shown). The extruder 26 extrudes the sheath 34 of plastics material around the composite tape-covered, paper covered undulating optical fibre ribbon structure in such a way that the plastics sheath is bonded to the outer plastics coating of the composite tape 33 and each bunch 35 of compacted yarns of glass fibre is embedded in the sheath at uniformly circumferentially spaced positions and has undulations that serve to improve the mechanical bonding of the bunch within the sheath and the flexibility of the cable. The ratio between the speed of the endless belts 21 carrying the formers 22 and the speed of extrusion of the sheath 34 is continuously and automatically maintained substantially constant so that the undulating optical fibre ribbon structure emerging from the endless belts is travelling at substantially the same speed as the extruded sheath 34 emerging from the extrusion machine 26.

What I claim as my invention is:

1. An optical fibre ribbon structure comprising a plurality of optical fibres and at least one flexible elongate reinforcing element of substantially resilient material arranged side by side and embedded in an elongate body of plastics material, wherein the resilient reinforcing element is set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure straightens in a lengthwise direction against the action of the undulating resilient reinforcing element thereby reducing the tensile force applied to the optical fibres and when the tensile force is removed, the ribbon structure returns towards its original undulating form.

2. An optical fibre ribbon structure as claimed in claim 1, wherein the axes of curvature of the undulations lie parallel to one another and substantially normal to the longitudinal axis of the optical fibre ribbon structure.

3. An optical fibre ribbon structure as claimed in claim 1, which includes at least two flexible elongate reinforcing elements of substantially resilient material uniformly spaced across the width of the ribbon structure.

4. An optical fibre ribbon structure as claimed in claim 3, which includes two flexible elongate reinforcing elements of substantially resilient material, the separate optical fibres being arranged side by side therebetween.

5. An optical fibre ribbon structure as claimed in claim 1, wherein the flexible resilient reinforcing element is or are of metal or metal alloy.

6. An optical fibre ribbon structure as claimed in claim 1, wherein the flexible resilient reinforcing element is of a non-metallic resilient material.

7. An optical fibre ribbon structure as claimed in claim 1, wherein the radius of curvature of each undulation of the undulating optical fibre ribbon structure is not less than 40 mm.

8. An optical cable having an outer sheath of plastics material and having, extending throughout its length, at least one bore in which is loosely housed at least one undulating optical fibre ribbon structure as claimed in claim 1.

9. An optical cable comprising at least two separte tubes of plastics material assembled together and surrounding the assembled tubes, an outer sheath of plastics material, the bore of at least one of the tubes having loosely housed therein at least one undulating optical fibre ribbon structure as claimed in claim 1.

10. An optical cable as claimed in claim 8 or 9, wherein the bore loosely housing an undulating optical fibre ribbon structure is substantially filled throughout its length with a greasy water-impermeable medium.

11. An optical cable as claimed in claim 8 or 9, wherein the bore loosely housing an undulating optical fibre ribbon structure is substantially filled throughout its length with a silicone gel.

12. A method of manufacturing an undulating optical fibre ribbon structure comprising a plurality of optical fibres and at least one flexible elongate reinforcing element of substantially resilient material arranged side by side and embedded in an elongate body of plastics material, wherein the resilient reinforcing element is set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure straightens in a lengthwise direction against the action of the undulating resilient reinforcing element thereby reducing the tensile force applied to the optical fibres and when the tensile force is removed, the ribbon structure returns towards its original undulating form, which method comprises causing a plurality of separate optical fibres and at least one flexible elongate reinforcing element of substantially resilient material to travel substantially side by side in the directions of their lengths with their axes lying in a substantially common plane; applying to the advancing optical fibres and to the advancing resilient reinforcing element an overall coating of a plastics material to form a plastics-coated reinforced optical fibre array; feeding the plastics-coated reinforced optical fibre array between a pair of advancing tapes; subjecting the advancing taped plastics-coated reinforced optical fibre array to a curing operation to cure the plastics material and cause it to bond both to the embedded optical fibres and resilient reinforcing element and lightly to the tapes; peeling the tapes away from the reinforced optical fibre array to form a reinforced optical fibre ribbon structure; and, before or after the tapes have been peeled away, causing the advancing ribbon structure to be partially wrapped around each of a plurality of transversely extending, longitudinally spaced formers of substantially at least partially circular cross-section travelling the the same direction as the advancing ribbon structure and at such a speed that there is substantially no relative movement between the advancing formers and the ribbon structure travelling therebetween, the direction of wrap around one former being in the opposite circumferential direction to the direction of wrap around the or each adjacent former and the circumferential extent of wrap around each of the formers being such that the resilient reinforcing element is set in such a form that the optical fibre ribbon structure follows a path of smoothly curved undulations whose axes of curvature lie transverse to the longitudinal axis of the ribbon structure.

13. A method as claimed in claim 12, wherein the advancing optical fibre ribbon structure is caused to pass between two sets of transversely extending, longitudinally spaced formers carried on a pair of advancing endless belts, the formers on one belt inter-engaging between the formers on the other belt.

14. A method as claimed in claim 12 in which the resilient reinforcing element is of metal or metal alloy, wherein the set in the resilient reinforcing element is mechanically formed by causing the advancing optical fibre ribbon structure to be partially wrapped around each of the plurality of formers which are of such diameter and so space apart and staggered with respect to the rectilinear axis of the advancing ribbon structure that the resilient reinforcing element is deformed beyond its elastic limit.

15. A method as claimed in claim 12 in which the resilient reinforcing element is of a non-metallic resilient material, wherein the set in the resilient reinforcing element is thermally formed by heating the advancing optical fibre ribbon structure upstream of the plurality of transversely extending, longitudinally spaced formers and, as the optical fibre ribbon structure is passing through the plurality of formers, cooling the ribbon structure to such an extent that undulations having the desired radius of curvature are set in the or each resilient reinforcing element.

* * * * *